US005391721A

United States Patent [19]

Hanen et al.

[11] Patent Number: 5,391,721

[45] Date of Patent: Feb. 21, 1995

[54] AQUEOUS FILM FORMING FOAM CONCENTRATES FOR HYDROPHILIC COMBUSTIBLE LIQUIDS AND METHOD FOR MODIFYING VISCOSITY OF SAME

[75] Inventors: Steven W. Hanen, Green Bay; Debbie L. Wagner, Marinette, both of Wis.

[73] Assignee: Wormald U.S., Inc., Marinette, Wis.

[21] Appl. No.: 13,308

[22] Filed: Feb. 4, 1993

[51] Int. Cl.$^6$ .......................... C08L 5/00; A62D 1/00; C08B 37/04

[52] U.S. Cl. ...................................... 536/3; 106/18.11; 106/18.21; 106/18.22; 106/18.24; 106/162; 106/205; 536/1.11; 252/2; 252/3; 252/6.5; 252/8.05; 169/46; 169/47

[58] Field of Search ...................... 536/3, 1.11; 514/54, 514/777, 779, 782; 252/2, 3, 6.5, 8.05, 6.10; 169/46, 47; 106/18.11, 18.21, 18.22, 18.24, 162, 205

[56] References Cited

U.S. PATENT DOCUMENTS

| | | | |
|---|---|---|---|
| 2,895,910 | 7/1959 | Merton et al. | 252/3 |
| 3,609,074 | 9/1971 | Mestre et al. | 252/8.05 |
| 4,060,489 | 11/1977 | Chiesa | 252/8.05 |
| 4,149,599 | 4/1979 | Chiesa | 169/47 |
| 4,306,979 | 12/1981 | Tsuji | 252/8.05 |
| 4,359,096 | 11/1982 | Berger | 169/47 |
| 4,387,032 | 6/1983 | Chiesa, Jr. | 252/3 |
| 4,401,648 | 8/1983 | Piechota, Jr. | 424/49 |
| 4,420,434 | 12/1983 | Falk | 546/346 |
| 4,424,133 | 1/1984 | Mulligan | 252/8.05 |
| 4,439,329 | 3/1984 | Kleiner et al. | 252/8.05 |
| 4,464,267 | 8/1984 | Chiesa et al. | 252/8.05 |
| 4,472,286 | 9/1984 | Falk | 252/3 |
| 4,536,298 | 8/1985 | Kamei et al. | 169/47 |
| 4,548,649 | 10/1985 | Choy et al. | 252/3 |
| 4,565,647 | 1/1986 | Llenado | 252/3 |
| 4,770,794 | 9/1988 | Cundasawmy et al. | 252/3 |
| 4,859,349 | 8/1989 | Clark et al. | 252/8.05 |
| 4,999,119 | 3/1991 | Norman et al. | 252/3 |
| 5,026,735 | 6/1991 | Stern | 252/3 |
| 5,218,021 | 6/1993 | Clark et al. | 252/3 |

FOREIGN PATENT DOCUMENTS

| | | |
|---|---|---|
| 162391 | 8/1952 | Australia . |
| 1116385 | 1/1982 | Canada . |
| 0034553 | 2/1981 | European Pat. Off. . |
| 59-44277 | 9/1982 | Japan . |
| 302172 | 4/1956 | United Kingdom . |
| 748211 | 3/1980 | United Kingdom . |
| 267346 | 8/1977 | U.S.S.R. . |
| 929121 | 3/1980 | U.S.S.R. . |
| 929125 | 10/1980 | U.S.S.R. . |
| 1125820 | 11/1982 | U.S.S.R. . |
| WO90101160 | 2/1991 | WIPO . |

*Primary Examiner*—Ronald W. Griffin
*Attorney, Agent, or Firm*—Morgan & Finnegan

[57] ABSTRACT

Aqueous film-forming foam (AFFF) concentrates for fighting polar and non-polar fuel and solvent fires, comprising hydrocarbon solvents, hydrocarbon surfactants, fluorosurfactants, high molecular weight polysaccharides, alginates, salts of aryl or alkylaryl sulfonates and water, and method for modifying the viscosity of the AFFF concentrates.

10 Claims, No Drawings

AQUEOUS FILM FORMING FOAM CONCENTRATES FOR HYDROPHILIC COMBUSTIBLE LIQUIDS AND METHOD FOR MODIFYING VISCOSITY OF SAME

BACKGROUND OF THE INVENTION

The present invention relates to aqueous film forming foam (AFFF) concentrates that are specially adapted for use on hydrophilic combustible liquids, but are as equally effective for use on hydrophobic liquids. AFFF concentrates are mixtures of surfactants, foam stabilizers and foaming agents which, after diluting with water and mixing with air, form a foam which covers the surface of a burning liquid, thereby enveloping and extinguishing fires on the liquid.

One type of AFFF concentrate is used for fighting hydrophobic fuel fires. AFFF concentrates used for fighting fires on hydrophobic fuels have consisted of a combination of fluorosurfactants, hydrocarbon surfactants and foam stabilizing solvents.

These concentrates have met considerable success in extinguishing fires on hydrophobic liquids, such as hydrocarbons and other non-polar fuels and solvents. AFFF concentrates, once diluted with water and mixed with air, have the ability to spread an aqueous foam on the surface of hydrophobic liquids, thereby extinguishing fires on such liquids.

AFFF concentrates used for fighting fires on hydrophobic liquids are generally diluted with water at a 3-part concentrate to 97-part water ratio. This dilution step is called proportioning. The resulting mixture is then mixed with air and the resulting foam is then applied to the burning hydrophobic liquid. A concentrate which is effective at a 3% dilution level is desired over a weaker concentrate, such as a concentrate which is diluted at a 6 part concentrate to 94 part water ratio, since the user must buy and store more of the weaker concentrate. The use of the stronger concentrate thus reduces storage space and results in reduced costs to the user.

The fighting of fires on hydrophilic liquids, such as alcohols and other polar solvents, is much more difficult than fighting fires on hydrophobic liquids. This is due to the tendency of the foam to dissolve in polar solvents. This problem is diminished by the addition of a water soluble high molecular weight polymer to the concentrate. The water soluble high molecular weight polymer precipitates on contact with the hydrophilic liquid and forms a protective layer, known as a gelatinous mat, which impedes the breakdown of the foam by the polar solvent fuel (see U.S. Pat. Nos. 4,306,979 and 4,060,489). AFFF concentrates containing water soluble high molecular weight polymers are effective on both hydrocarbon and water soluble fuels. Since about the mid 1960's, a polymer typically added to the AFFF concentrate is a high molecular weight polysaccharide, including, but not limited to xanthan gum, guar gum, welan gum and rhamsam gum.

In order to obtain the benefits of the gelatinous mat formed by the high molecular weight polysaccharides it has been found that relatively large quantities of the high molecular weight polysaccharides are needed. While a gelatinous mat will form irrespective of the concentration of the high molecular weight polysaccharides, performance is unsatisfactory at lower concentrations. A drawback to the use of a high concentration of the polymer is that it results in concentrates with a very high viscosity. A typical AFFF concentrate containing a high molecular weight polysaccharide will exhibit a viscosity of 3000–5000 centipoise (cps) when measured using a Brookfield viscometer with a number 4 spindle set at 30 rpm. The high viscosity of the concentrate creates problems in delivery and dilution of the concentrate in foam system applications.

PROBLEMS

In order to formulate foaming compositions utilizing AFFF concentrates, the concentrate must be diluted with either sea water or fresh water. Early attempts to create an AFFF concentrate which would be effective on polar solvents at a 3:97 dilution were thwarted by the high viscosity of the concentrate due to the presence of the high molecular weight polysaccharide. The fire fighting industry was forced to weaken the concentrate by adding less active ingredients, including the polysaccharide, and in turn dilute the concentrate at a ratio of 6:94. While the weakening of the concentrate lessened its viscosity, it lead to higher cost and storage requirements. In order to have enough concentrate to dilute at a 6:94 ratio it is necessary to purchase and store twice as much concentrate as that necessary to dilute in a 3:97 ratio.

Indeed, U.S. Pat. Nos. 4,536,298 and 4,999,119 recognize this problem when they state that AFFF concentrates containing high molecular weight polysaccharides must be diluted to 6% by weight in water. These patents are an admission as to the failure of the art to provide to the industry an AFFF concentrate specially adapted for hydrophilic liquids and practically dilutable at 3%.

One of the reasons AFFF concentrates containing high molecular weight polysaccharides have not been widely used at a 3:97 dilution is that they are too viscous to proportion practically and efficiently with water. Proportioning refers to the introduction of an AFFF concentrate into a flowing stream of water. Proper concentrate proportioning is essential to ensure the optimum performance from an AFFF concentrate.

The most common method of proportioning AFFF concentrates is the balanced pressure method. All balanced pressure systems use a modified venturi device called a proportioner or ratio flow controller. The proportioner consists of a waterinlet, a concentration inlet, a metering orifice, a low pressure area and a foam solution discharge area. As water flows through the proportioner a low pressure area is created in which the pressurized concentrate mixes with the water stream. The metering orifice at the concentrate inlet regulates the rate of concentrate flow and thus determines the percentage of concentrate in the foam solution.

The problems encountered in proportioning AFFF concentrates containing high molecular weight polysaccharides are related to the high viscosity of the concentrate. The water flow into the proportioner reduces the pressure in the proportioner, causing a difference in pressure between the tank which holds the concentrate and the proportioner, thereby drawing the concentrate out of the holding tank and mixing it with water. It takes a higher pressure difference to draw in a highly viscous concentrate and a concomitant higher water flow to provide this higher pressure difference. This results in a large quantity of water being used, which is not practical in applications where water supply is limited. In order to deal with this problem the concentrate had to be weakened, thereby lowering the viscosity, as illustrated by the prior practice of the industry to use AFFF concentrates with high molecular weight polysaccharides at 6:94 dilutions.

Another problem encountered in the use of AFFF concentrates with high viscosity is that such concentrates, upon dilution, form a foam that is not easily spreadable across the surface of a burning hydrophilic liquid. The high molecular weight polysaccharide, after dilution, acts to increase the viscosity of the resultant foam, which causes the foam to spread slowly across the liquid. Due to this slow spreadability, higher amounts of the foam need be applied at higher application rates. Therefore, in order to extinguish a fire, large amounts of foam are applied to the area, resulting in waste and environmental problems in the disposal of the exhausted foam.

Yet another problem encountered in AFFF concentrates which contain high molecular weight polysaccharides is that they are less efficient for use with sea water. In order to work, the polysaccharide must bond with water in order to swell and protect the foam. Divalent cations in sea water, must notably calcium ions, preferentially compete for hydrophilic sites on the polysaccharide, causing the polysaccharide to cross-link and form a filamentous gel, rendering the polysaccharide useless.

Further, highly viscous AFFF concentrates present storage and handling difficulties, especially at low temperatures of about 0° C.

The present invention solves the problems encountered in the delivery and dilution of AFFF concentrates containing high molecular weight polysaccharides.

OBJECTS OF THE INVENTION

An object of this invention is to provide an AFFF concentrate capable, upon dilution with water, of extinguishing fires on both hydrophilic and hydrophobic liquids.

Another object of this invention is to provide an AFFF concentrate that will ensure that the foam formed upon dilution will not break down in hydrophilic combustible liquids.

Another object of this invention is to provide an AFFF concentrate which can be practically and efficiently proportioned at a 3 part concentrate to a 97 part water dilution ratio.

Another object of this invention is to provide an AFFF concentrate which, after diluting with water, will provide a foam with excellent spreadability.

Yet another object of this invention is to provide an AFFF concentrate that can be diluted with sea water and still provide an effective foam.

Another object of this invention is to provide an AFFF concentrate with a lower workable viscosity.

Still another object of this invention is to provide a method for the manipulation of the viscosity of AFFF concentrates containing high molecular weight polysaccharides.

SUMMARY OF THE INVENTION

The invention of this specification is a composition for use as an aqueous film forming foam concentrate which comprises:

(a) one or more hydrocarbon solvents at a concentration of about 5% by weight to about 7% by weight, (b) one or more hydrocarbon surfactants at a concentration of about 16% by weight to about 20% by weight, (c) one or more fluorosurfactants at a concentration of about 5% by weight to about 9% by weight, (d) one or more polysaccharides, having a molecular weight of greater than 300,000, at a concentration of about 0.5% by weight to about 1.8% by weight, (e) one or more alginates, from a group consisting of sodium alginate, potassium alginate or propylene glycol alginate, at a concentration of about 0.1% by weight to about 0.9% by weight, (f) one or more sulfonates from a group consisting of salts of aryl sulfonate or alkylaryl sulfonate at a concentration of about 0.1% by weight to about 6% by weight, and (g) water at a concentration of about 55.3% by weight to about 73.3% by weight.

Further, the invention includes a method for manipulating the viscosity of the above-mentioned concentrate which enables the maintenance of a desirable viscosity. It has been found desirable to maintain the viscosity of the concentrate in a range of between 300 to 2700 cps as measured with a Brookfield viscometer, preferably between 400 to 600 cps. This method consists of the manipulation of the ratio of the concentration of the alginates to the concentration of high molecular weight polysaccharides in the range of about 1:3 to about 1:1 and further, the manipulation of the ratio of the concentration of the aryl or alkylaryl sulfonate salts to the concentration of the hydrocarbon surfactants in the range of about 1:200 to about 1:4.

DETAILED DESCRIPTION OF THE INVENTION

The instant invention relates to the addition of low to medium molecular weight polysaccharides, specifically alginates, to an AFFF concentrate which contains high molecular weight polysaccharides. By adding the alginates and manipulating the ratio of the concentrations of the alginates and the high molecular weight polysaccharides, the viscosity of the AFFF concentrate can be lowered to permit ease of mixing the AFFF concentrate with water, without sacrificing the fire fighting ability of the resulting foam. In addition to the alginate addition, aryl or alkylaryl sulfonate salts are added to further lower the viscosity of the concentrate and to enhance the ability of the resultant mixture to foam.

The viscosity of the concentrate can be manipulated by varying the ratio of the concentration of the alginate to the concentration of the high molecular weight polysaccharides within a 1:1 to 1:3 range. The alginates and high molecular weight polysaccharides act together to form a mixture which exhibits flow properties either lower than concentrates containing only high molecular weight polysaccharides or higher than concentrates containing only alginates.

A typical concentrate containing only a high molecular weight polysaccharide will exhibit a viscosity of 3000–5000 cps using a Brookfield viscometer with a number 4 spindle set at 30 rpm. The addition of the alginates to that concentrate will yield a concentrate with a viscosity ranging from 1000 to 2700 cps.

The addition of either the salt of an aryl or an alkylaryl sulfonate in conjunction with the alginate/high molecular weight polysaccharide combination has the effect of reducing the viscosity of the concentrate still further. The aryl or alkylaryl sulfonate works by bonding to the hydrophilic sites of both the alginates and the high molecular weight polysaccharides, thereby reducing the ability of the alginate and the polysaccharide to swell. However, a formulation too rich in sulfonates will cause too much of a decrease in the ability of the polysaccharides to swell and the concentrate would be ineffective. The addition of sulfonates should be limited so that the concentrate will have a viscosity of at least 300 cps.

In addition to the viscosity lowering ability of the sulfonate salts, aryl and alkylaryl sulfonates are also surfactants, which improves the foamability of the resultant diluted concentrate.

While the addition of the alginates and the aryl or alkylaryl sulfonate salts lowers the viscosity of the AFFF concentrate, the foam forming ability and the fire fighting ability of the concentrate is not diminished. Indeed, because of the higher foaming ability and the ability of the foam to spread faster due to the lower viscosity of the foam, less foaming mixture needs to be used to gain the same fire fighting ability as previously known AFFF concentrates.

PREFERRED EMBODIMENTS

The hydrocarbon solvents of this invention are selected from the glycol ether family; preferably, ethylene glycol monobutyl ether, ethylene glycol or 1-butoxyethoxy-2-ethanol.

The high molecular weight polysaccharides are thixotropic polysaccharides having a molecular weight of greater than 300,000; preferably, they are selected from one or more fermented polysaccharides, including but not limited to, welan, rhamsam or xanthan gums or a high molecular weight polysaccharide derived from plant material, such as guar gum.

The alginates of this invention are sodium, potassium or propylene glycol alginates.

All known hydrocarbon surfactants are useful. Surfactants which exhibit amphoteric behavior are preferred. Sodium octyl sulfate, derivatives of octylphenol with polyoxyethylene chain lengths ranging from 12 to 30 and partial sodium salts of N-Laurylbetaiminodipropionate are more preferred. Mixtures of the hydrocarbon surfactants have also been found to be useful.

The fluorosurfactants include, but are not limited to, (i) fluorinated telomers, (ii) amphoteric fluorosurfactants, (iii) polyfluorinated amine oxide, (iv) fluoroalkyl ethylthio polyacrylimids, (v) perfluoroalkyl ethylthiapolyacrylamides, (vi) derivatives of 1-propanaminium, 2-Hydroxy-N,N,N-Trimethyl-3-GAMMA-OMEGA-Perfluoro-$C_6$–$C_{20}$-Alkyl) thio, chloride, (vii) fluoroalkyl sodium sulfonate, and (viii) sodium salts of 1-Propanesulfonic acid, 2-methyl-, 2-{{1-oxo-3-{(gamma,-omega,- perfluoro-$C_{14}$–$C_{26}$-alkyl) thio} propyl} amino} derivative.

The salts of aryl sulfonate or alkyl aryl sulfonate are preferably selected from the group of sodium aryl or sodium alkylaryl sulfonates.

The amount of sodium alkylaryl sulfonate (SAAS) or sodium aryl sulfonate (SAS) which can be added to the concentrate is determined by the ratio of the concentration of the sulfonate salt to the concentration of the hydrocarbon surfactants. As the concentration of the sulfonate increases relative to the concentration of the hydrocarbon surfactant a minimum viscosity is reached, beyond which the product begins to separate and the concentrate is no longer useful. It is necessary to maintain a minimum viscosity of approximately 300 cps. This minimum viscosity can be maintained if the sulfonate is limited to an amount which would result in an approximate 1:4 ratio to the hydrocarbon surfactant concentration. Less sulfonate can be added with a concomitant lesser effect on the viscosity of the concentrate.

The addition of the SAAS or SAS provides two advantages, the first being the viscosity modification discussed above and the second, the enhancement of foamability upon dilution.

EXAMPLES

The viscosity effect of the addition of the alginates and the sulfonates is illustrated by the following examples. However, the scope of the invention is not to be limited by these examples.

In all cases the mixing speed of the blending was held constant. In order to formulate the concentrates of the following examples the hydrocarbon surfactants, fluorosurfactants and water are mixed initially. To that mix is added a slurry of the high molecular weight polysaccharide, alginate and hydrocarbon solvent. This mixture is blended for 2 hours and then the SAAS is added. After blending, the pH of the composition was adjusted with caustic soda so that the composition exhibited a pH of approximately 7.0–8.5. All viscosity measurements were made using a Brookfield model LVF viscometer with a number 4 spindle set at 30 rpm.

The following ingredients were used:

Fluorosurfactants: 4.0% by weight Lodyne F-102R and 2.3% by weight Lodyne K 90'90. Lodyne F-102R is a mixture of approximately 24% by weight fluoroalkyl sodium sulfonate, 15% by weight 1-propanaminium, 2-Hydroxy-N,N,N-Trimethyl-3-{GAMMA-OMEGA-Perfluoro-$C_6$–$C_{20}$-Alkyl} thio, chloride, 50% by weight Fluoroalkyl ethylthio Polyacrylamide, the balance water. Lodyne K 90'90 is a sodium salt of 1-Propanesulfonic acid, 2-methyl-, 2-{{1-oxo-3-{(gamma,-omega,-perfluoro-$C_{14}$–$C_{26}$alkyl}thio}propyl}amino} derivative.

Hydrocarbon surfactants: 18.2% by weight Deriphat D-160C, a partial sodium salt of N-Lauryl0betaiminodipropionate and 1.8% by weight sodium octyl sulfate (tradename DeSulfos or OLS).

Hydrocarbon solvent: 1-butoxyethoxy-2-ethanol (tradename Butyl Carbitol).

High molecular weight polysaccharide: Xanthan gum (tradename Keltrol RD or Keltrol BT).

Alginate: Sodium alginate (tradename Kelgin XL).

Salt of aryl or alkylaryl sulfonate: Sodium alkylaryl sulfonate (SAAS).

EXAMPLE 1

An AFFF concentrate according to the present invention was prepared by compounding the ingredients in the amounts shown:

| | % by Weight |
|---|---|
| Fluorosurfactants | 6.3 |
| Hydrocarbon surfactants | 20.0 |
| SAAS | 3.9 |
| Hydrocarbon solvent | 7.0 |
| High molecular weight polysaccharide | .85 |
| Alginate | .85 |
| Water | Balance |

A final viscosity of 500 cps was achieved.

EXAMPLE 2

For comparison, a known AFFF concentrate was prepared:

| | % by Weight |
|---|---|
| Fluorosurfactants | 6.3 |
| Hydrocarbon surfactants | 20.0 |
| Hydrocarbon solvent | 7.0 |
| High molecular weight polysaccharide | 1.7 |
| Water | Balance |

A final viscosity of 3200 cps was achieved.

EXAMPLE 3

To illustrate that the alginate alone, even without the addition of the SAAS, lowers the viscosity of the concentrate, the following formulation was prepared:

| | % by Weight |
|---|---|
| Fluorosurfactants | 6.3 |
| Hydrocarbon surfactants | 20.0 |
| Hydrocarbon solvent | 7.0 |
| High molecular weight polysaccharide | 1.275 |
| Alginate | .425 |
| Water | Balance |

A final viscosity of 2520 cps was achieved.

EXAMPLE 4

To illustrate that the viscosity can be varied through the manipulation of the ratio of the concentration of the alginate to the concentration of the high molecular weight polysaccharide, a formulation was prepared which combined the alginate and the high molecular weight polysaccharide in equal amounts:

| | % by Weight |
|---|---|
| Fluorosurfactants | 6.3 |
| Hydrocarbon surfactants | 20.0 |
| Hydrocarbon solvent | 7.0 |
| High molecular weight polysaccharide | .85 |
| Alginate | .85 |
| Water | Balance |

A final viscosity of 1775 cps was achieved.

EXAMPLE 5

In order to illustrate the combined viscosity effect of the addition of the SAAS and alginate, the SAAS was added to the concentrate of Example 3 in an amount that resulted in the following formulation:

| | % by Weight |
|---|---|
| Fluorosurfactants | 6.3 |
| Hydrocarbon surfactants | 20.0 |
| SAAS | 3.9 |
| Hydrocarbon solvent | 7.0 |
| High molecular weight polysaccharide | 1.275 |
| Alginate | .425 |
| Water | Balance |

A final viscosity of 1150 cps was achieved.

PROPORTIONING

In order to illustrate how the AFFF concentrate of this invention provides the benefit of improved proportioning, the concentrate of Example 2, the known AFFF concentrate, with a viscosity of approximately 3200 cps, was compared to the concentrate of Example 1 which had a viscosity of approximately 500 cps. In this comparison the concentrates were proportioned in a 3 part concentrate to 97 part water mixture. The comparison illustrates that lower water flows are needed to proportion the concentrate of the present invention to the desired mixture.

The concentrates of Examples 1 and 2 were proportioned using the balanced pressure method discussed above. A foam proportioning system using a branched manifold with 2 inch, 3 inch and 6 inch water input lines were used. The concentrate was stored in a bladder proportioning tank. Various flow rates in gallons per minute (gpm) were established for each of the 2, 3 and 6 inch water input lines and were adjusted until they provided a final mixture of 3 parts concentrate to 97 parts water.

| Concentrate | Proportioner Line | Orifice Size | Water Flow for 3:97 Dilution |
|---|---|---|---|
| Example 2 | 2 inches | .203 inches | 115 gpm |
| Example 1 | | | 90 gpm |
| Example 2 | 3 inches | .390 inches | 249 gpm |
| Example 1 | | | 129 gpm |
| Example 2 | 6 inches | .760 inches | 440 gpm |
| Example 1 | | | 291 gpm |

This test establishes that the AFFF concentrate of the present invention can be practically proportioned at 3:97 dilution ratios at water flow rates significantly lower than flow rates necessary to proportion AFFF concentrates of high viscosity. This ease of proportioning is important in applications where water availability is limited.

FIRE FIGHTING ABILITY

In order to illustrate that the concentrate of the present invention maintains the ability to fight fires on hydrophilic solvents while providing a concentrate with lower viscosity than known AFFF concentrates adapted for use on hydrophilic solvents, fire extinguishing tests were undertaken. Each of the concentrates of Examples 1 and 2 were tested in their ability to fight fires on Methylethyl Ketone (MEK), Ethyl alcohol (EA) and Methyl Alcohol (MA).

The known AFFF concentrate of Example 2 was diluted to a 3 parts concentrate to 97 part water mixture, first with fresh water and then with sea water. Each of these mixtures was tested for fire fighting ability:

| Fuel | Application Rate | Dilution Water | 90% Control | Extinguishment Time | 20% Burnback |
|---|---|---|---|---|---|
| MEK | 0.09 | Fresh | 0:49 | 1:50 | S.E.[a] |
| | 0.09 | Salt | 0:41 | 3:14 | S.E. |
| EA | 0.09 | Fresh | 0:30 | 3:04 | S.E. |
| | 0.09 | Salt | 0:34 | 3:09 | 1 $ft^2$ |
| MA | 0.09 | Fresh | 0:43 | 3:30 | S.E. |

-continued

| Fuel | Application Rate | Dilution Water | 90% Control | Extinguishment Time | 20% Burnback |
|---|---|---|---|---|---|
| | 0.09 | Salt | 0:41 | 4:40 | 1 $ft^2$ |

[a]self-extinguishment, see page 19.

In comparison, the inventive concentrate of Example 1 was also diluted to a 3:97 mixture with both sea and fresh water and fire tested:

| Fuel | Application Rate | Dilution Water | 90% Control | Extinguishment Time | 20% Burnback |
|---|---|---|---|---|---|
| MEK | 0.06 | Fresh | 0:40 | 1:50 | 2 $ft^2$ |
| | 0.06 | Salt | 0:40 | 3:11 | 2 $ft^2$ |
| EA | 0.06 | Fresh | 0:48 | 2:51 | S.E. |
| | 0.06 | Salt | 0:35 | 3:50 | 1.5 $ft^2$ |
| MA | 0.06 | Fresh | 0:41 | 2:37 | S.E. |
| | 0.06 | Salt | 0:45 | 3:42 | S.E. |

All fire testing was conducted to the specification outlined in UL 162 Standard for Safety Foam Equipment and Liquid Concentrates, Underwriters Laboratory, sixth edition, dated Mar. 7, 1989.

Fuel temperature was maintained at 15° C. (59° F.) for all fires. The fire test pan had a surface area of 50$ft^2$ and an attached backboard and contained 55 gallons of fuel for each test.

The fuel was given a one minute preburn before foam application. After the preburn, and while the fire was burning, the foam was applied through a nozzle to the fire test pan in such a manner that the foam impacted the back board and flowed back across the surface of the fuel. At no time was the nozzle removed from the stand nor was the nozzle allowed to break the vertical plane of the front edge of the pan.

The foam was applied to the burning fuel in the test pan in the above described manner for five minutes. In order to pass the requirements of UL 162 the fire must be extinguished by the end of the five minute application period.

The time for total extinguishment of the fire, if less than the five minute application period, is noted. Should the fire be extinguished before the five minute application time has elapsed, foam application is continued until the five minute period is reached.

As illustrated, the foams formed from both the concentrate of Example 2 and the concentrate of Example 1 acted to extinguish the fire well within the five minute time limit required by UL 162 for each of the burning test liquids, and in fact for most tests the foam of the concentrate of the present invention (Example 1) extinguished the fire faster than the foam of the known concentrate.

During the foam application, the point at which 90% of the fire is extinguished is visually determined by the operator, and the amount of time required to achieve this 90% extinguishment is noted as "90% control".

As with the total extinguishment test, the foam from the concentrate of the present invention exhibits similar 90% extinguishment performance to the foam of the known concentrate. Fire fighting ability is maintained in the concentrate of the present invention.

After the foam is applied for five minutes the application is stopped and the first of two torch tests is conducted. The torch test is conducted by running a lit torch along the edges of the test pan approximately 2-3 inches above the foam blanket and along the center line of the foam blanket. The torch test is conducted in order to determine that the foam blanket forms a seal over the fuel so that no vapors can escape. If the fuel reignites during the torch test, the foam is considered a failure. A second torch test is conducted approximately 9 minutes after the first torch test. Both the foams of the known concentrate and the concentrate of the present invention passed the torch test in all instances.

One minute after the second torch test is complete a test is conducted which measures the foam's resistance to burnback. The ability of the foam to resist burnback is a measure of the foam's ability to prevent reignition of the fuel and is a function of the durability of the foam and the foam's ability to avoid breaking down in the fuel.

The burnback test is conducted by placing a sleeve, which resembles a stove pipe, in the foam blanket, thereby isolating 1 $ft^2$ of fuel and foam from the rest of the materials in the test pan. The foam in the sleeve is removed and the remaining blanket of foam over the fuel in the test pan is allowed to stand for 15 minutes. At the end of the 15 minute period the fuel within the burnback sleeve is ignited and allowed to burn for one minute. After one minute the sleeve is removed.

The foam's resistance to burnback is measured by measuring the portion of the area of the fuel that becomes reinvolved in the fire. The burnback test is carried out until 20% of the fuel in the test pan is reinvolved or until five minutes has elapsed. Should 20% of the blanket be reinvolved before the five minute period has expired the test is considered a failure. In the illustrative test, a 50 $ft^2$ test pan was used, therefore a limit of 10 $ft^2$ of fuel reinvolved in under five minutes is the upper limit for the burnback test.

As illustrated, both the known concentrate and the concentrate of the present invention passed the burnback resistance test. For the known concentrate the burnback test resulted in either self extinguishment (S.E.) of the reignited fuel or a maximum reinvolvement of 1 $ft^2$ of fuel. For the concentrate of the present invention the burnback test resulted in self extinguishment of the reignited fuel or a maximum reinvolvement of 2 $ft^2$ of fuel. Both the known concentrate and the concentrate of the present invention passed the burnback test with no significant differences.

APPLICATION RATE

Another benefit of the concentrate of the present invention is illustrated by the column entitled "application rate". The application rate of the foam is determined by measuring the flow rate of the test nozzle in gallons per minute (gpm) and then dividing that value by the size of the fire test pan. In the illustrative example for the 3:97 mixture of the known concentrate it was necessary to use a 4.5 gpm nozzle to cover the 50 $ft^2$ test pan, resulting in a application rate of 0.09 gpm/$ft^2$.

In contrast, for the mixture of the concentrate of the present invention and water a 3.0 gpm nozzle was used to cover the 50 $ft^2$ test pan, resulting in a application rate of 0.06 gpm/$ft^2$. The ability to use a lower flow nozzle for the mixture of the concentrate of the present invention is related to its lower viscosity. Because it has a lower viscosity, the resulting 3:97 mixture of the concentrate with water has a lower viscosity, and therefore, flows more readily. Since the mixture flows more readily, the fire test pan can be covered using a lower application rate without sacrificing fire fighting ability.

The ability to use a lower application rate without sacrificing firefighting ability provides the end user with the economic benefit of using less foaming mixture and therefore less concentrate. The end user also gains the environmental benefit of having to dispose of less exhausted foam after the fire has been extinguished.

This can be illustrated by a simple mathematical analysis. In the illustrative example for the known concentrate of Example 2, applied at a 0.09 gpm/ft$^2$ rate, foam was applied to the test pan at a rate of 4.5 gallons per minute for five minutes for a total of 22.5 gallons for the test. In contrast, for the concentrate of Example 1, the foam was applied to the test pan at a rate of 3.0 gallons per minute for a total foam mixture usage of 15 gallons per minute. Therefore, the lower application rate for the inventive mixture in this example leads to a saving of 7.5 gallons while maintaining the firefighting ability of the foam mixture.

EXPANSION RATE

Another benefit of the use of the mixture resulting from a 3:97 dilution of the concentrate of the present invention is that the mixture expands at a much greater rate than the mixture resulting from a 3:97 dilution of the known concentrate.

A mixture resulting from the known concentrate of Example 2 showed the ability to expand 4.8 times the mixture's original volume when foaming. When the same known concentrate was diluted with sea water, it was able to expand 4.2 times its original volume when foaming. All expansion testing was done pursuant to UL 162.

In contrast, the concentrate of Example 1 resulted in a mixture which had the ability to expand to 6.7 times its original volume when mixed with fresh water and to 6.0 times its original volume when mixed with sea water.

This greater ability to expand means that the foam will be more efficient and less mixture and concentrate need be used, without sacrificing the firefighting ability of the foam.

This increased ability of the mixture of the concentrate of Example 1 to expand over its original volume is due to the addition of the sodium alkylaryl sulfonate. The sulfonate acts as a surfactant which increases the ability of the mixture to a foam and expand.

SEA WATER DURABILITY

Another benefit imparted by the concentrate of the present invention is that the 3% dilution of the concentrate of the present invention results in a more persistent foam than the mixture of the 3% known concentrate when each are diluted in sea water. This benefit is provided by the addition of the alginate and the sulfonate salts to the concentrate.

In the known concentrate there is only a high molecular weight polysaccharide used to impart the gelatinous mat to protect the foam. The high molecular weight polysaccharide has hydrophilic sites which bond with water and allow the polysaccharide to swell. In sea water, divalent cations, such as the calcium ion, compete with water for the hydrophilic sites. Calcium ions from the sea water will preferentially attach to the polysaccharide, causing the polysaccharide to cross-link with itself and to form a filamentous gel. This selective bonding with ions present in sea water results in a foam that is less persistent over polar solvents.

In contrast, the concentrate of the present invention minimizes this cross-linking phenomena. The addition of the alginate enables the polysaccharide/alginate combination to resist the calcium ions from sea water. The alginate demonstrates brine tolerance and masks the cation interaction with the high molecular weight polysaccharides and minimizes the cross-linking of the polysaccharides.

The addition of the alkylaryl and aryl sulfonates enhances this resistance to cross-linking. The sulfonates also mask the hydrophilic sites of the polysaccharide and prevent the cross-linking of the polysaccharide.

This polysaccharide/alginate/sulfonate combination exhibits a greater brine tolerance and protects the foam in sea water. This is illustrated by the 25% drain time testing discussion below.

DRAIN TIME

Another benefit of the concentrate of the present invention is illustrated by the 25% drain time of the resultant mixtures of the concentrates as tested under UL 162:

| | 25% Drain Time (minutes:seconds) |
|---|---|
| Known Concentrate 3% With Water (Example 2) | |
| Fresh water dilution | 28:30 |
| Sea water dilution | 18:53 |
| Inventive Concentrate 3% With Water (Example 1) | |
| Fresh water dilution | 21:16 |
| Sea water dilution | 20:03 |

Drain time is defined in UL 162 as the amount of time necessary to drain 25% of the water from the foam. As illustrated above, the fresh water 3% dilution of the known concentrate exhibits a very high 25% drain time. This high drain time means that the polysaccharide in fresh water is holding the water to a point where it inhibits the flowability of the foam. It is desired that the water drain from the foam so that the water can act as a cooling system for the engulfed area. In contrast, the fresh water dilution of the concentrate of Example 1 exhibits a 21:16 drain time, which shows that the foam from the concentrate of Example 1 will release its water in order to cool the area and also to preserve flowability.

The 25% drain time in a sea water dilution for the known concentrate drops dramatically from the 25% drain time in a fresh water dilution. This illustrates the above-discussed problem with diluting the known concentrate in sea water. The fact that the sea water dilution of the known concentrate loses its water more rapidly illustrates the fact that the polysaccharide is being selectively bound by the cations in the sea water. In contrast, 25% drain time of the sea water dilution of the concentrate of Example 1 is very close to the 25% drain time of its fresh water dilution, illustrating that the concentrate of Example 1 does not suffer from the cross-linking problem associated with sea water dilution.

What is claimed is:

1. A composition for-use as an aqueous film forming foam concentrate with a viscosity in the range of 300 to 2700 cps as measured with a Brookfield viscometer, which comprises:

(a) one or more hydrocarbon solvents at a concentration of about 5% by weight to about 7% by weight, (b) one or more hydrocarbon surfactants at a concentration of about 16% by weight to about 20% by weight, (c) one or more fluorosurfactants at a concentration of about 5% by weight to about 9% by weight, (d) one or more thixotropic polysaccharides selected from the group consisting of fermented polysaccharides and polysaccharides derived from plant material and having a molecular weight of greater than 300,000 at a concentration of about 0.5% by weight to about 1.8% by weight, (e) one or more low to medium molecular weight alginates selected from the group consisting of sodium alginate, potassium alginate and propylene glycol alginate at a concentration of about 0.1% by weight to about 0.9% by weight wherein said alginates are present at a concentration in a ratio to the concentration of the high molecular weight polysaccharide from about 1.3 to about 1.1, (f) one or more sulfonates selected from the group consisting of salts of aryl sulfonates and salts of alkylaryl sulfonates at a concentration of about 0.1% by weight to about 6% by weight, and (g) water at a concentration of about 55.3% by weight to about 73.3% by weight.

2. A composition according to claim 1 wherein said sulfonates are present at a concentration in a ratio to the concentration of said hydrocarbon surfacts from about 1:200 to about 1:4.

3. A composition according to claim 1 wherein said polysaccharides are selected from the group consisting of welan, rhamsam, xanthan and guar gums.

4. A composition according to claim 1 wherein said hydrocarbon solvents are selected from the group consisting of ethylene glycol monobutyl ether, ethylene glycol and 1-butoxyethoxy-2-ethanol.

5. A composition according to claim 1 wherein said hydrocarbon surfactants exhibit amphoteric behavior.

6. A composition according to claim 5 wherein said hydrocarbon surfactants are selected from the group consisting of derivatives of octylphenol with polyoxyethylene chain lengths ranging from 12 to 30, partial sodium salts of N-Laurylbetaiminodipropionate and sodium octyl sulfate.

7. A composition according to claim 6 wherein said fluorosurfactants are selected from the group consisting of (i) fluorinated telomers, (ii) amphoteric fluorosurfactants, (iii) polyfluorinated amine oxide, (iv) fluoroalkyl ethylthio polyacrylimids, (v) perfluoroalkyl ethylthiapolyacrylamides, (vi) derivatives of 1-propanaminium, 2-Hydroxy-N,N,N-Trimethyl-3-{GAMMA-OMEGA-Perfluoro-$C_6$–$C_{20}$-Alkyl} thio, chloride, (vii) fluoroalkyl sodium sulfonate and (viii) sodium salts of 1-Propanesulfonic acid, 2-methyl-, 2-{{1-oxo-3-{(gamma,-omega,-perfluoro-$C_{14}$–$C_{26}$-alkyl) thio} propyl} amino} derivative.

8. A composition according to claim 1 wherein said salts of aryl sulfonates and said salts of alkylaryl sulfonates are sodium salts.

9. A method for modifying the viscosity of the composition of claim 1 which comprises varying the ratio of the concentration of the alginates to the concentration of the high molecular, weight polysaccharides over a range from about 1:3 to about 1:1, varying the ratio of the concentration of the sulfonates to the concentration of the hydrocarbon surfactants over a range from about 1:200 to about 1:4 and maintaining the viscosity of said composition between about 300 cps and 2700 cps.

10. The method of claim 9 wherein the viscosity is maintained between about 400 cps and 600 cps.

* * * * *